United States Patent
Bougard et al.

(10) Patent No.: US 10,793,805 B2
(45) Date of Patent: Oct. 6, 2020

(54) AQUEOUS LUBRICATING COMPOSITION

(71) Applicant: SOPURA S.A., Courcelles (BE)

(72) Inventors: Francois Bougard, La Louviere (BE); Philippe Vanhelleputte, Houdeng-Aimeries (BE); Armelle David Loghmanian, Geel (BE); Pierre Stachura, Leval (BE)

(73) Assignee: SOPURA S.A., Courcelles (BE)

( * ) Notice: Subject to any disclaimer, the term of this patent is extended or adjusted under 35 U.S.C. 154(b) by 0 days.

(21) Appl. No.: 16/075,162

(22) PCT Filed: Mar. 21, 2017

(86) PCT No.: PCT/EP2017/056669
§ 371 (c)(1),
(2) Date: Aug. 3, 2018

(87) PCT Pub. No.: WO2017/162654
PCT Pub. Date: Sep. 28, 2017

(65) Prior Publication Data
US 2019/0316060 A1    Oct. 17, 2019

(30) Foreign Application Priority Data

Mar. 25, 2016   (BE) .................................. 2016/5215
May 9, 2016   (BE) .................................. 2016/5325

(51) Int. Cl.
| | | |
|---|---|---|
| C10M 173/02 | (2006.01) |
| C10M 125/10 | (2006.01) |
| C10M 129/32 | (2006.01) |
| C10M 129/40 | (2006.01) |
| C10M 133/06 | (2006.01) |
| C10M 145/28 | (2006.01) |
| C10M 141/06 | (2006.01) |
| C10M 161/00 | (2006.01) |
| B65G 45/02 | (2006.01) |
| C10N 30/04 | (2006.01) |
| C10N 30/20 | (2006.01) |
| C10N 40/00 | (2006.01) |

(52) U.S. Cl.
CPC ......... *C10M 173/025* (2013.01); *B65G 45/02* (2013.01); *C10M 125/10* (2013.01); *C10M 129/32* (2013.01); *C10M 129/40* (2013.01); *C10M 133/06* (2013.01); *C10M 141/06* (2013.01); *C10M 145/28* (2013.01); *C10M 161/00* (2013.01); *B65G 2201/0235* (2013.01); *C10M 2201/02* (2013.01); *C10M 2201/062* (2013.01); *C10M 2207/122* (2013.01); *C10M 2207/126* (2013.01); *C10M 2207/281* (2013.01); *C10M 2209/104* (2013.01); *C10M 2215/26* (2013.01); *C10N 2030/04* (2013.01); *C10N 2030/20* (2013.01); *C10N 2040/38* (2020.05)

(58) Field of Classification Search
CPC combination set(s) only.
See application file for complete search history.

(56) References Cited

U.S. PATENT DOCUMENTS

| | | | | |
|---|---|---|---|---|
| 4,929,375 A | * | 5/1990 | Rossio | ................... C02F 9/005 508/415 |
| 2004/0053793 A1 | | 3/2004 | Li et al. | |
| 2009/0325830 A1 | * | 12/2009 | Schnur | ................. C10M 141/12 508/186 |
| 2019/0241825 A1 | * | 8/2019 | Barton | ................. C10M 137/08 |

FOREIGN PATENT DOCUMENTS

| | | |
|---|---|---|
| DE | 4244536 A1 | 7/1994 |
| WO | WO 9311865 A1 | 6/1993 |
| WO | WO 2008032284 A2 | 3/2008 |

OTHER PUBLICATIONS

P Stachura: "InnovaTech fête ses 10 ansce Sep. 24, 2012 et présente 50 innovations wallonnes !", InnovaTech, Sep. 24, 2012 (Sep. 24, 2012), p. 1 and 14, XP055276878.
Written Opinion of PCT/EP2017/056669, dated May 11, 2017, pp. 1-12.

* cited by examiner

*Primary Examiner* — Ellen M McAvoy
*Assistant Examiner* — Chantel L Graham
(74) *Attorney, Agent, or Firm* — Leydig, Voit & Mayer, Ltd.

(57) ABSTRACT

A lubricating composition includes: from 0.1% to 10% by weight of a first organic acid including a fatty acid containing from 4 carbon atoms to 18 carbon atoms; from 1% to 10% by weight of a fatty amine containing from 10 carbon atoms to 26 carbon atoms; from 0.1% to 5% by weight of an acidity corrector; up to 10% by weight of a dispersant; up to 10% by weight of a second organic acid; up to 10% by weight of an organic solvent; and from 50% to 98.8% by weight of water.

15 Claims, No Drawings

AQUEOUS LUBRICATING COMPOSITION

CROSS-REFERENCE TO PRIOR APPLICATIONS

This application is a U.S. National Phase application under 35 U.S.C. § 371 of International Application No. PCT/EP2017/056669, filed on Mar. 21, 2017, and claims benefit to Belgian Patent Application No. BE 2016/5215, filed on Mar. 25, 2016, and Belgian Patent Application No. BE 2016/5325, filed on May 9, 2016. The International Application was published in French on Sep. 28, 2017 as WO 2017/162654 under PCT Article 21(2).

FIELD

The present invention relates to a novel lubricating composition, to the process for obtaining same and to the use thereof for lubrication, but also cleaning and disinfection, of transporting means used in the food industry, in particular conveyor belts used in the food industry, more particularly conveyor belts for beverage containers, in particular glass or plastic bottles or cans.

BACKGROUND

In the beverage industry, it is known practice to package beverages in containers, such as plastic or metal barrels or cans, glass or plastic bottles, in particular made of polyethylene terephthalate (PET) or polycarbonate (PC) in the course of a production process during which various production units perform various steps, for instance the exiting of the packaging, the washing of the containers, the filling of the containers, the closing of the containers, the labeling of the containers and the packaging of the containers. Generally, the containers are conveyed from one unit to the other by transporting means, in particular conveyor belts, which may comprise, or consist of, various metal materials, such as steel, stainless steel or polymeric materials such as polyoxymethylene (POM sold under the trade name Delrin®).

In order to enable the containers to be moved on conveyor belts, without this causing them to fall off, and in order to minimize the friction forces inherent in any movement, a solution, termed lubricating solution, is applied to the conveyor belt, either by immersion or by spraying. Generally, the lubricating solution is an aqueous solution containing hydrophobic chemical compounds capable of migrating at the interface of the conveyor belt in order to thus form a film. This film is responsible for the slip properties of the lubricant.

Consequently, an effective lubricating composition, in particular a composition for lubricating conveyor belts for beverage containers, must meet precise specifications. A lubricating composition must especially reduce the friction forces inherent in the moving of containers on the belts, since poor lubrication, and therefore excessively high friction, can result in the container falling. Conversely, excessive lubrication prevents the beverage containers from advancing and can result in relaxation of the conveyor belts. Another critical point consists of the stability of the containers, in particular of bottles.

Furthermore, it must be possible for the lubricating composition to be applied to transporting means either "intermittently" or "continuously". An "intermittent" application consists of a phase of conditioning transporting means by application of the lubricating composition for a period of about 20 minutes, followed by batchwise spraying of the same composition for a period of approximately 15 seconds every 85 seconds. A "continuous" application corresponds to spraying of the lubricating composition for a period of approximately 30 seconds, followed by a break of approximately 30 seconds.

In addition, this aqueous lubricating composition must be stable for use under various application conditions. This is because various types of water with various hardnesses can be used, that is to say hard waters (>30° fH (or French degrees)), soft waters (<10° fH (or French degrees)) and waters with intermediate hardness.

Likewise, the temperature is a critical parameter. An effective lubricating composition must be stable at a temperature of between approximately 5° C. and approximately 40° C. This point is all the more important since instability can result in precipitation of the lubricating composition and in fouling phenomena of pipes or nozzles or of various parts useful in lubricating or moving conveyor belts.

Preferably, an effective lubricating composition, in particular in the form of a concentrate, must also be compatible with the materials constituting the transporting means, to which it is applied, that is to say must be compatible with steel, stainless steel, or guides and belts made of polymeric materials. Furthermore, since the transporting means, in particular the conveyor belts, are potentially in contact with beverages, it is essential that said lubricating composition can meet the appropriate hygiene standards.

Disinfecting treatments must regularly be applied to transporting means in order to reduce, or eliminate, microorganism proliferation. The most suitable disinfection operations are obtained by using oxidizing agents, for example compositions based on, or comprising, aqueous hydrogen peroxide or chlorine dioxide. Consequently, it may be advantageous to have a lubricating composition capable of cleaning and/or disinfecting the transporting means. It is therefore advantageous for the effective lubricating composition to optionally be biocidal, and especially for it to be compatible with the application of such biocide molecules, while at the same time being non-toxic or of low toxicity to humans or animals.

Since the inside of the container, in particular of a bottle, can be contaminated by the lubricating composition, it may be advantageous for the latter not to modify the organoleptic properties of the product contained in the container, and, furthermore, to have optimal toxicological properties in order to reduce its possible detrimental impact on the environment, by having the advantage of not requiring the excessive use of starting materials or of water, but also by not inducing a high toxicity on the microorganisms present in purification plants to which the lubricating compositions are conveyed after the cleaning of conveyor belts.

The lubricating compositions currently used are solutions of fatty acids, generally comprising between 12 and 18 carbon atoms, in a soluble alkali form or alternatively in alkanolamine form. It is known practice to use these compounds in the form of an emulsion, that is to say in a homogeneous system constituted by the dispersion of a fatty phase stabilized in an aqueous matrix by emulsifiers.

Fatty acid soaps, partially or completely neutralized in aqueous solution, for instance calcium oleate, are known to be sensitive to water hardness and to form insoluble fatty acid salts, which negatively influences their slip capacity. Thus, it appears that the performance level of these soaps varies according to the pH and the hardness of the diluting water used.

Thus, in order to overcome these drawbacks, it is possible either to add to them one or more chelating agents, for example acetic acid derivatives, such as ethylenediaminetetraacetic acid (EDTA), which has the advantage of being biodegradable, or to use only softened water.

Furthermore, these soaps, which have a tendency to react with the carbon dioxide dissolved in the application solution, also have the drawback of constituting a medium conducive to the growth of microorganisms and have the drawback of forming an abundant foam.

In addition, these soaps may also be incompatible with certain materials from which the supports to be treated are made and metal corrosion phenomena of said supports are possible.

A second solution proposed in the prior art is based on the application of lubricating emulsions of oil-in-water type, which consist of a dispersion of a mono-, di- or triglyceride fatty acid in an aqueous matrix in the presence of emulsifiers.

International patent applications WO 93/11865 and WO 2008/032284 describe the use of emulsions and the impact of the size of the microdroplets of oil dispersed, the type of emulsifier, the anionic surfactants or the type of "fatty" phase to be used (oleic fatty acid, mono/di/triglyceride) on the stability of the solutions to be used.

However, since these emulsions are, by virtue of their nature, thermodynamically unstable, they can undergo phase separation. This results in a loss of effectiveness of any lubricating solution incorporating these emulsions, but also in possible soiling of conveyor belts, spray pipes or spray nozzles and therefore in possible biological proliferation in these areas of soiling.

A third solution known from the prior art consists in using neutralized primary fatty amines or diamines, having both lubricating properties and a biocidal action. Amines termed "fatty amines" are amines bonded to a hydrocarbon-based chain, of more than 8 carbon atoms and generally of less than 22 carbon atoms, often derived from renewable natural materials such as tallow, stearins or oleins of vegetable oils, such as rapeseed, palm oil, palm kernel, soya or coconut. Primary amines are often present in the form of a mixture and usually comprise between 12 and 18 carbon atoms distributed in a hydrocarbon-based chain including more than 10% unsaturation. Lubricants based on N-alkylated fatty amine derivatives containing at least one secondary amine and/or one tertiary amine are also known.

For example, patent application US 2004/0053793 describes a lubricating composition constituted by the mixture of an acetate salt of a diamine, of a solidifying agent consisting of a polyalkylene glycol polymer and of an anionic surfactant, in order to be able to provide a lubricating agent available in solid or liquid form. However, while fatty amines are not very stable, they are also less expensive than soaps and, unlike soaps, are not very sensitive to the hardness of the water used. It is also known that numerous conventional surfactant molecules present in lubricating compositions have a negative role on the slip properties, namely a lowering of the friction coefficient.

SUMMARY

In an embodiment, the present invention provides a lubricating composition, comprising: from 0.1% to 10% by weight of a first organic acid comprising a fatty acid containing from 4 carbon atoms to 18 carbon atoms; from 1% to 10% by weight of a fatty amine containing from 10 carbon atoms to 26 carbon atoms; from 0.1% to 5% by weight of an acidity corrector; up to 10% by weight of a dispersant; up to 10% by weight of a second organic acid; up to 10% by weight of an organic solvent; and from 50% to 98.8% by weight of water.

DETAILED DESCRIPTION

Embodiments of the present invention provide a novel lubricating composition which does not have the drawbacks of the prior art compositions.

In particular, embodiments of the present invention provide an effective and stable lubricating composition, in particular a lubricating composition which is insensitive or not very sensitive to the hardness of the water used as solvent, and in particular is suitable for the hardness of any type of mains water which may be greatly variable and preferably suitable for any type of application, in particular suitable for application by continuous and intermittent or batchwise spraying.

Embodiments of the present invention provide a lubricating composition which is simple to use and which has a stability suitable for application in the lubrication of conveyor belts for beverage containers and which can also keep conveyor belts lubricating for a prolonged period of time, even in the event of a break in this application of the lubricating composition of the invention.

Embodiments of the present invention provide a lubricating composition which has a reduced impact on (is not harmful to) the treatment of water, and which is not very toxic, in particular on the microorganisms present in purification plants.

Embodiments of the present invention provide a lubricating composition which is compatible with contact with food product containers, such as bottles, barrels and cans which may contain beverages.

The present invention is a lubricating composition, preferably in the form of a micro-emulsion in an aqueous solvent and comprising:

from approximately 0.1% to approximately 10% by weight of one or more first organic acid(s), said first organic acid being a fatty acid preferably containing from 4 carbon atoms to 18 carbon atoms, more particularly from 6 carbon atoms to 12 carbon atoms, from approximately 1% to approximately 10% by weight of a fatty amine containing 10 carbon atoms to 26 carbon atoms, from approximately 0.1% to approximately 5% by weight of an acidity corrector, up to 10%, preferably from 0.1% to approximately 10% by weight, of a dispersant, up to 10%, preferably from 0.1% to approximately 10% by weight, of a second organic acid, up to 10%, preferably from 0.1% to approximately 10% by weight, of an organic solvent and from approximately 50% to approximately 98.8% by weight of water or of an aqueous solution, these percentages being calculated by weight so as to obtain a lubricating composition corresponding to 100% by weight.

Advantageously, in the lubricating composition according to the invention, the ratio between the fatty acid and the fatty amine is between 1/9 (10 fatty acid/90 fatty amine), preferably from 2/8 (20 fatty acid/80 fatty amine) or 3/7 (30 fatty acid/70 fatty amine) to 1/1 (50 fatty acid/50 fatty amine) by weight between the fatty acid and the fatty amine.

In the lubricating composition of the invention, the fatty acid is preferably selected from the group consisting of octanoic acid, decanoic acid, hexanoic acid, lauric acid and sebacic acid, and a mixture thereof.

According to one variant of implementation of the invention, the fatty amine is selected from the group consisting of monoamines, polyamines, preferably diamines, and a mixture thereof.

Advantageously, in the lubricating composition of the invention, the fatty amine comprises from 10 carbon atoms to 26 carbon atoms, preferably from 12 carbon atoms to 22 carbon atoms and is preferably selected from the group consisting of lauryl amine, oleyl amine, N-oleyl-1,3-diaminopropane, N-lauryl-1,3-diaminopropane, and a mixture thereof.

In the lubricating composition of the invention, the dispersant is preferably selected from the group consisting of neutral or anionic dispersants.

In particular, in the lubricating composition of the invention, said dispersant is selected from the group consisting of the polysorbate, an ethoxylated and carboxylated alcohol, an ethoxylated fatty acid, a poly(ethylene oxide) carboxylate, a carboxylic ester, in particular a sucrose ester, or a mixture thereof.

Preferably, in the lubricating composition of the invention, the organic solvent is selected from the group consisting of ethyl lactate, glycol, such as (di)ethylene glycol, (di)propylene glycol or butylene glycol, alcohol, such as butyl glycol or 2-ethylhexanol, glycerol, and a mixture thereof.

In addition, in the lubricating composition of the invention, the second organic acid is selected from the group consisting of citric acid, acetic acid, propionic acid, lactic acid and a mixture thereof.

The lubricating composition of the invention can also comprise an acidity corrector which is a base selected from the group made up of NaOH, KOH and a mixture thereof.

Preferably, the lubricating composition of the invention is clear at ambient temperature for a period of more than 48 hours.

Another aspect of the invention relates to the use of the lubricating composition of the invention for lubricating conveyor belts and optionally guides of a system for transporting or conveying beverage containers or to a process for lubricating said conveyor belts and optionally said guides of said system for transporting or conveying said beverage containers, by spraying the lubricating composition of the invention onto these conveyor belts and optionally onto these guides of said transporting system.

According to the invention, the beverage containers are preferably selected from the group consisting of bottles, barrels or cans, made of various materials, such as polyethylene terephthalate (PET), polyethylene naphthalate, polycarbonate (PC), glass or metal, while the materials of the conveyor belts or of the guides are selected from the group consisting of steel, stainless steel or plastics, such as polyoxymethylene (POM).

Advantageously, said lubricating composition of the invention is administered by continuous or intermittent or batchwise spraying onto this support, in particular onto said conveyor belts and said guides.

According to one preferred embodiment of the invention, said spraying is carried out according to the following alternation:

spraying of a solution of the lubricating composition of the invention at approximately 0.7% applied for a period of between approximately 10 seconds and approximately 50 seconds, preferably between approximately 20 seconds and approximately 40 seconds, absence of spraying for a period of between approximately 10 seconds and approximately 50 seconds, preferably between approximately 20 seconds and approximately 40 seconds, spraying of a solution of the lubricating composition of the invention at approximately 0.4% for a period of between approximately 5 seconds and approximately 30 seconds, preferably between approximately 10 seconds and approximately 20 seconds and absence of spraying for a period of between approximately 50 seconds and approximately 120 seconds, preferably between approximately 70 seconds and approximately 100 seconds.

The present invention is described below in examples presented by way of non-limiting illustrations of preferred embodiments of the invention.

The present invention relates to a lubricating composition for conveyor belts for containers used in the food industries, in particular in the beverage industry, said containers being for example bottles, barrels or cans to be cleaned or to be filled, that is to say a lubricating composition which facilitates the passage and the movement of said containers on conveyor belts and against other devices, such as guides, of a system for transporting these containers.

The innovative nature of this invention is based on an advantageous combination in a novel composition of several elements which interact synergistically to form a lubricating composition which is effective, but which has a reduced level of fatty amine(s), while at the same time forming a stable and clear solution, when it is stored, preferably without stirring and at a temperature of between approximately 4° C. and approximately 40° C., for a period of more than 48 hours, preferably of more than 72 hours or even more than 100 hours.

Advantageously, the lubricating composition of the invention corresponds to a true solution, preferably in the form of a micro-emulsion, containing the various elements dissolved in an appropriate solvent, in particular an aqueous solvent, such as mains water, available at various hardnesses, and forming this solution, regardless of its degree of hardness for the water used. Preferably, this aqueous solution is essentially and advantageously clear and stable, that is to say free of phase-separation phenomenon, for more than 48 hours, preferably for more than 72 hours. This solution advantageously corresponds to the conditions as defined previously. Specifically, the composition according to the invention makes it possible to create, unexpectedly, an electrostatic complex between the anionic charges of the fatty acid(s) and the cationic charges of the partially neutralized fatty amine(s). In the composition according to the invention, the amine(s) promote(s) the dispersion of the fatty acid-fatty amine complex.

The lubricating composition of the invention constitutes a clear improvement compared with the products currently proposed which are based on the bulk use of these fatty amines which are potentially toxic and poorly degradable by microorganisms and can have an impact on purification plants. Furthermore, the inventors have discovered, unexpectedly, that, contrary to the prior art compositions, the composition of the invention retains its lubricating nature for a prolonged period of time. In particular, the inventors have observed that conveyor belts maintained in a humid atmosphere retain effective lubrication for several hours, in particular more than 24 hours, after a break in the application of the lubricating composition of the invention to these conveyor belts. This characteristic is particularly advantageous, since it makes it possible to treat this problem of a break in application or to modify the conditions of this application without disrupting the movement of these conveyor belts and effective movement of beverage containers.

The lubricating composition according to the invention can preferably comprise:
a) from 0.1% to 10%, by weight, of a first organic acid corresponding to a short-chain or medium-chain fatty acid, that is to say a fatty acid comprising few carbon atoms, preferably between 4 carbon atoms and 18 carbon atoms, in particular a short-chain fatty acid comprising 6 carbon atoms to 12 carbon atoms, said fatty acid preferably being selected from the group consisting of octanoic acid, decanoic acid, hexanoic acid, lauric acid, sebacic acid and a mixture thereof;
b) from 1% to 10%, by weight, of a fatty amine, preferably a monoamine or a diamine comprising from 10 carbon atoms to 26 carbon atoms ($C_{10}$-$C_{26}$), preferably from 12 carbon atoms to 22 carbon atoms ($C_{12}$-$C_{22}$), preferably selected from the group consisting of lauryl amine, oleyl amine, N-oleyl-1,3-diaminopropane, N-lauryl-1,3-diaminopropane and a mixture thereof;
c) up from 5%, preferably from 0.1% to 5%, by weight, of one or more surfactant molecule(s), of one or more dispersant(s), of one or more surfactant(s), of one or more emulsifier(s), preferably a surfactant molecule, a dispersant, a surfactant or an emulsifier, of food type or compatible with foods and not harmful or not toxic to animals, including human beings, said surfactant molecule, said dispersant, said surfactant or said emulsifier advantageously being of neutral type or of anionic type, preferably selected from the group consisting of polysorbate, ethoxylated and carboxylated fatty alcohols, the poly(ethylene oxide) carboxylate sold by Clariant® under the brand name Emulsogen® and sucrose ester;
d) from 0.1% to 5%, by weight, of an acidity corrector, preferably KOH or NaOH or a mixture of these bases, in order for the solution obtained to have a pH of between approximately 6 and approximately 8, preferably a pH of about 7;
e) up to 10%, preferably from 0.1% to 10%, of one or more organic solvent(s), preferably selected from the group consisting of ethyl lactate, a glycol, a polyol, an alcohol and a mixture thereof;
f) up to 10%, preferably from 0.1% to 10%, of a second organic acid, preferably a second organic acid selected from the group consisting of acetic acid, citric acid, propionic acid, lactic acid and a mixture thereof; and
g) a suitable %, of between 50% and 98.8% by weight, preferably between 60% and 98.5% by weight, of water so as to obtain a total % of 100% by weight of the lubricating composition.

Advantageously, the surfactant molecule, the dispersant, the surfactant or the emulsifier used in the composition of the invention may be, or may comprise, polysorbate, sulfates, sulfonates, sulfosuccinates, sulfonated esters, sulfonated amides, phosphate esters, anionic carboxylates, in particular dioctyl sodium sulfosuccinate, sodium lauryl sulfate or a mixture thereof. The nonionic surfactant molecule may be, or may comprise, ethoxylated alkylphenols, ethoxylated aliphatic alcohols or carboxylic esters, in particular a sucrose ester.

The composition of the invention may also comprise other substances usually present in lubricating compositions, such as a stabilizer, a biocidal agent, in particular a biofilm-inhibiting agent, an anti-oxidant, a foam-inhibiting or foam-forming molecule, a protective agent against corrosion, an ink, a dye, an antistatic agent, a viscosity-controlling agent or a fragrance. These various substances are preferably obtained from renewable biological materials.

Preferably, the composition of the invention is compatible with the materials used in conveyor belts, such as the elements and guides made of plastic or of metal, such as stainless steel.

The composition of the invention has the advantage of being able to be brought into contact with solid or liquid food products and of also being compatible with various disinfecting products, including oxidizing agents, capable of making it possible to maintain a good sanitary situation of the transporting facility treated and thus limiting the proliferation of microorganisms. Organoleptic tests have also demonstrated the absence of impact of a contamination due to the lubricating composition on the properties of the beverages, in particular of beer.

The invention also relates to the use of the lubricating composition of the invention for lubricating devices for transporting beverage containers, which is preferably carried out by spraying onto conveyor belts and guides made of plastic or of metal, intended to move these beverage containers, in particular bottles, barrels or cans, this spraying being carried out continuously or intermittently or batch-wise. This spraying is in particular carried out via nozzles with an appropriate cross section, with or without the application of energy means, in the form of compressed air or of sonication devices (by generation of ultrasound), preferably via nozzles at appropriate pressures, in particular of approximately 50 psi or less and at a flow rate of approximately 25 or of approximately 33 in 30/30 on/off spraying at approximately 0.2% volume or in 15/85 on/off spraying at approximately 0.7% volume, capable of spraying the lubricating composition of the invention in the form of fine droplets onto the appropriate solid support. Preferably, this spraying of the lubricating composition of the invention is carried out according to the following step cycle:
spraying of the lubricating composition of the invention at approximately 0.7% for approximately 30 seconds,
absence of spraying for approximately 30 seconds,
spraying of the lubricating composition of the invention at approximately 0.4% for approximately 15 seconds,
absence of spraying for approximately 85 seconds.

The terms "percentage by weight" or wt % correspond to the concentration of a substance, that is to say the weight of this substance divided by the total weight of the composition in which it is present and multiplied by 100. Unless otherwise specified, the amount of an ingredient present in the lubricating composition of the invention will correspond to the amount of this active ingredient.

The term "approximately" is used in order to include the numerical variation of a measurement of a substance or of a parameter, relative to errors of measurement and variable as a function of the measuring tools used or as a function of the variation in purity, of the source or of the means of production of the substance described. Generally, this variable may be plus 10% or minus 10%, preferably plus or minus 5%, of the value mentioned or claimed.

Example 1

Comparison between the lubricating composition of the invention (example) and of the composition known from the prior art (comparative example). Table 1 below presents the minimum and maximum values as percentage by weight, of each of the various components that may be present in the lubricating composition of the invention and to which has been added an appropriate percentage of approximately 50% to approximately 98.8% of water, preferably of approximately 60% to approximately 98.5% of water, so to obtain 100% by total weight of the lubricating composition claimed.

TABLE 1

Lubricating composition of the invention

| | Minimum value | Maximum value |
|---|---|---|
| Organic solvent | 0% | 10% |
| Organic acid | 0% | 10% |
| Fatty amine | 1% | 10% |
| $C_4$ to $C_{18}$ fatty acid | 0.1% | 10% |
| Neutral or anionic dispersant - surfactant | 0% | 5% |
| KOH or NaOH | 0.1% | 5% |

TABLE 2

Composition of the invention and comparative example

| | Example | LURD058RD190 |
|---|---|---|
| Water | 91.83 | 92.63% |
| Ethyl lactate (solvent) | 1.00% | 1.00% |
| Acetic acid 80 vol % | 0.50% | 0.50% |
| Lauryl amine | 0.70% | 0.70% |
| Octanoic acid | 0.50% | 0.00% |
| Emulsogen Col 100 ® (poly(ethylene oxide) carboxylate sold by Clariant ®) | 0.60% | 0.60% |
| Acetic acid 80 v. % | 1.32% | 1.32% |
| Oleyl amine | 2.15% | 2.15% |
| 50% KOH w/w | 1.40% | 1.10% |

Evaluation Method

For the purposes of evaluating the effectiveness of the lubricating composition of the invention, the friction coefficient is determined for a given load. This measurement presents a friction force determined by a force sensor, in particular a dynamometer or a force gauge as sold by Chatillon® and will correspond to a slip or a friction coefficient of between 0.10 N and 0.15 N.

Below the value of 0.10 N, the conveyor belts do not ensure movement of the bottles, and above 0.15 N, the containers fall at the slightest impact.

Ten liters of, on the one hand, a fatty acid-free comparative solution (comparative example in table 2) and, on the other hand, of the lubricating solution of the invention as described in the example are presented in table 2; both, diluted to 0.7% by volume in osmosed water (0° fH or French degrees), are applied by spraying onto a bottle conveyor belt. The spraying is carried out "batchwise or intermittently" with 15 seconds of spraying and 85 seconds of non-spraying or with "continuous" spraying, spraying for 30 seconds/30 seconds.

The bottles are then placed on the conveyor belt, thus treated, which is moving. The total duration of the test is 95 minutes.

The first 3000 seconds correspond to the installation of the lubricating film on the conveyor belt.

In the example of the invention, it is sought to measure a friction coefficient, via the applied push by glass bottles, with a load of 10 kg, on the force sensor, during the movement of a stainless steel conveyor belt, that is to say to generate a force of less than approximately 20 N applied for a period of 1200 seconds.

Stabilization of the force applied is observed between 3000 seconds and 5500 seconds.

For the test, a difference in force of less than approximately 2 N between 3000 seconds and 5500 seconds is targeted.

After approximately 5500 seconds, the spraying is stopped and the increase in the force applied on the force sensor or dynamometer is analyzed, with a force of less than approximately 20 N after approximately 6600 seconds being targeted.

The friction coefficients between the glass bottles and the stainless steel conveyor belt are determined through the test. Since the friction decreases in the first minutes of the test, the time required for effective measurement in the test phase is called "conditioning". Once conditioned, the conveyor belt must have a slip or a friction coefficient of between 0.10 and 0.15. The friction coefficient communicated therefore corresponds to the value obtained during operation, that is to say after conditioning. The inventors measured the friction coefficients as a function of time after spraying of the lubricating compositions according to the example and according to the comparative example, onto a stainless steel conveyor belt. These results are summarized in table 4. Table 4 presents the duration of the conditioning step which will correspond to the installation of the slip film, the duration of normal operation and the non-spraying duration which measures the resistance of the film generated.

TABLE 4

| | Duration | Measurement duration | Composition of the invention | Composition according to the comparative example |
|---|---|---|---|---|
| Conditioning | 0 to 3000 sec | 1200 | 13.5 | 22.4 |
| Operation | 3000 to 5700 sec | delta 3000-5500 | 0.5 | 1.3 |
| Non-spraying | 5700 to 6600 sec | 6600 | 16.8 | 16.9 |

TABLE 5

Concentration of the lubricant: 0.7 v % and a water hardness of 0° F.

| | Duration | Measurement duration | Control parameter |
|---|---|---|---|
| Conditioning | 0 to 3000 sec | 1200 | <20 |
| Operation | 3000 to 5700 sec | delta 3000-5500 | <2 |
| Non-spraying | 5700 to 6600 sec | 6600 | <20 |

The inventors noted, unexpectedly, a difference in performance level between the composition according to the invention and the composition of the comparative example, which is free of fatty acid, in the speed of installation of the film. This speed with which a correct slip is achieved will depend on the affinity of the lubricating composition for the conveyor belt, preferably a stainless steel conveyor belt, in particular after generation of a film of the lubricating composition on the conveyor belt. If this film is uniform, the bottles will be stable and if this film is quite thick, the slip will be maintained at an appropriate level for a prolonged period, preferably of several hours, or even for more than 24 hours, without additional provision by spraying of further amounts of lubricating composition. It also appears that the formula of the invention, containing 2.85% by weight of fatty amine and 0.7% by weight of fatty acid, unexpectedly appears to be more effective than a solution of the prior art (comparative example), that is to say a fatty acid-free composition of which the total % with the other components, including the solvent, is 100%.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A lubricating composition, comprising:
   from 0.1% to 10% by weight of a first organic acid being fatty acid containing from 8 carbon atoms to 12 carbon atoms;
   from 1% to 10% by weight of a fatty amine containing from 12 carbon atoms to 22 carbon atoms, wherein the fatty amine is a polyamine;
   from 0.1% to 5% by weight of an acidity corrector;
   from 0.1% to 10% by weight of a dispersant;
   from 0.1% to 10% by weight of a second organic acid;
   from 0.1% to 10% by weight of an organic solvent; and
   from 50% to 98.8% by weight of water.

2. The composition of claim 1, wherein a ratio between the fatty acid and the fatty amine is between 1/9 and 1/1.

3. The composition of claim 1, wherein the fatty acid is selected from the group consisting of octanoic acid, decanoic acid, and lauric acid, and a mixture thereof.

4. The composition of claim 1, wherein the fatty amine is selected from the group consisting of lauryl amine, oleyl amine, N-oleyl-1,3-diaminopropane or 1a N-lauryl-1,3-diaminopropane, and a mixture thereof.

5. The composition of claim 1, wherein the dispersant is selected from the group consisting of neutral dispersants and anionic dispersants.

6. The composition of claim 1, wherein the dispersant is selected from the group consisting of polysorbate, an ethoxylated and carboxylated alcohol, an ethoxylated fatty acid, a poly(ethylene oxide) carboxylate, a carboxylic ester, and a mixture thereof.

7. The composition of claim 1, wherein the organic solvent is selected from the group consisting of ethyl lactate, glycol, alcohol and a mixture thereof.

8. The composition of claim 1, wherein the second organic acid is selected from the group consisting of citric acid, acetic acid, propionic acid, lactic acid and a mixture thereof.

9. The composition of claim 1, wherein the acidity corrector comprises a base selected from the group consisting of NaOH, KOH and a mixture thereof.

10. The composition of claim 1, wherein the composition is clear at ambient temperature for more than 48 hours.

11. A method for lubricating container conveyor belts comprising:
    applying the composition of claim 1 to belts and/or guides of the container conveyor belts.

12. The method of claim 11, wherein containers transported on the container conveyer belts are selected from the group made up of bottles, barrels or cans.

13. The method of claim 11, wherein the composition is applied by continuously spraying.

14. The method of claim 11, wherein the composition is applied by intermittently spraying.

15. The method of claim 14, wherein the spraying is carried out according to the following alternation:
    spraying of a solution of the composition at 0.7%, applied for a period of between 10 seconds and 50 seconds;
    absence of spraying for a period of between 10 seconds and 50 seconds;
    spraying of a solution of the composition at 0.4%, for a period of between 5 seconds and 30 seconds; and
    absence of spraying for a period of between 50 seconds and 120 seconds.

* * * * *